(No Model.) 6 Sheets—Sheet 1.

E. W. ROSS, Dec'd.
M. F. Ross, Executrix.
CANE CUTTER.

No. 558,001. Patented Apr. 7, 1896.

(No Model.) 6 Sheets—Sheet 6.

E. W. ROSS, Dec'd.
M. F. Ross, Executrix.
CANE CUTTER.

No. 558,001. Patented Apr. 7, 1896.

WITNESSES
INVENTOR

UNITED STATES PATENT OFFICE.

ELMORE W. ROSS, OF SPRINGFIELD, OHIO; MARY F. ROSS EXECUTRIX OF SAID ELMORE W. ROSS, DECEASED.

CANE-CUTTER.

SPECIFICATION forming part of Letters Patent No. 558,001, dated April 7, 1896.

Application filed February 6, 1890. Serial No. 339,503. (No model.)

*To all whom it may concern:*

Be it known that I, ELMORE W. ROSS, a citizen of the United States, residing at Springfield, in the county of Clark and State of Ohio, have invented certain new and useful Improvements in Cane-Cutters, of which the following is a specification.

My invention relates to a machine particularly adapted for cutting cane into small lengths preparatory to the manufacture of sugar therefrom.

One object of my invention is to provide means whereby the cane as it comes from the field in various sizes and lengths and frequently broken and crooked may be automatically fed to the cutting mechanism in a uniform and perfect manner.

A further object of my invention is to provide means for varying the length of cut of the machine, so that the length of the chips may be varied as desired to suit the varying character of the cane and to adapt it to the different processes to which it may be afterward subjected.

A further object of my invention is to provide a novel machine which shall embody a cutting mechanism in connection with a comminuting device to cut the cane in length and reduce it to a comminuted or fibrous condition.

A further object of my invention is to provide novel constructions whereby the cutting-cylinder may be removed and be replaced by another similar cylinder with sharpened knives, or for other purposes, without disturbing the other mechanism.

A further object of my invention is to provide novel constructions in the feeding mechanism to prevent breakage of parts or damage to the machine resulting therefrom.

A further object of my invention is to provide novel constructions in the cutting and comminuting mechanisms and the means for operating the same.

My invention consists in the various constructions and combinations of parts hereinafter described, and pointed out in the claims.

In the accompanying drawings, Fig. 7 is a rear elevation, some of the parts being shown in section. Fig. 8 is a detailed sectional view of a portion of the feeding mechanism, illustrating the adjustment thereof. Fig. 9 is a view, partly in section, of the compression-roll used in connection with the feeding-carrier. Figs. 10 and 11 are details of some of the parts hereinafter referred to.

Like parts are represented by similar letters of reference throughout the several views.

In the said drawings, A A represent the main frame, on which the cutting and driving mechanism is supported, as is also the main driving mechanism.

B is the cutting-cylinder, which is mounted in suitable bearings $a\ a\ a$ on the main frame, provided with removable caps to permit the cutting-cylinder to be removed therefrom. The power to drive the cutting-cylinder is transmitted by a belt or other suitable means to a pulley $B'$, mounted on the cutting-cylinder shaft $B^2$. This pulley $B'$ is a safety driving-pulley and is constructed with friction-bearings and automatic releasing devices, by which it is released from the shaft and turns freely thereon in case an undue strain is placed upon the cutting-cylinder sufficient to cause a difference in the speed of the cylinder-shaft and the said pulley, the construction of this wheel being fully described and set forth in my Letters Patent No. 504,479, issued September 5, 1893, for safety driving mechanism.

The cutting-cylinder B is completely incased within the frame A A by means of a swinging hood $B^3$, provided with suitable hinges $a'\ a'$ to permit it to be opened upwardly, and by a rear door B⁵, having hinges $a^2$ $a^2$ to permit the said door to swing outwardly, thus completely exposing the cutting-cylinder B, so that the same may be readily lifted from its bearings $a$ $a$ by opening said hood and door and removing the tops of said bearings in a manner which will be readily understood.

Figures 3, 4, 5:
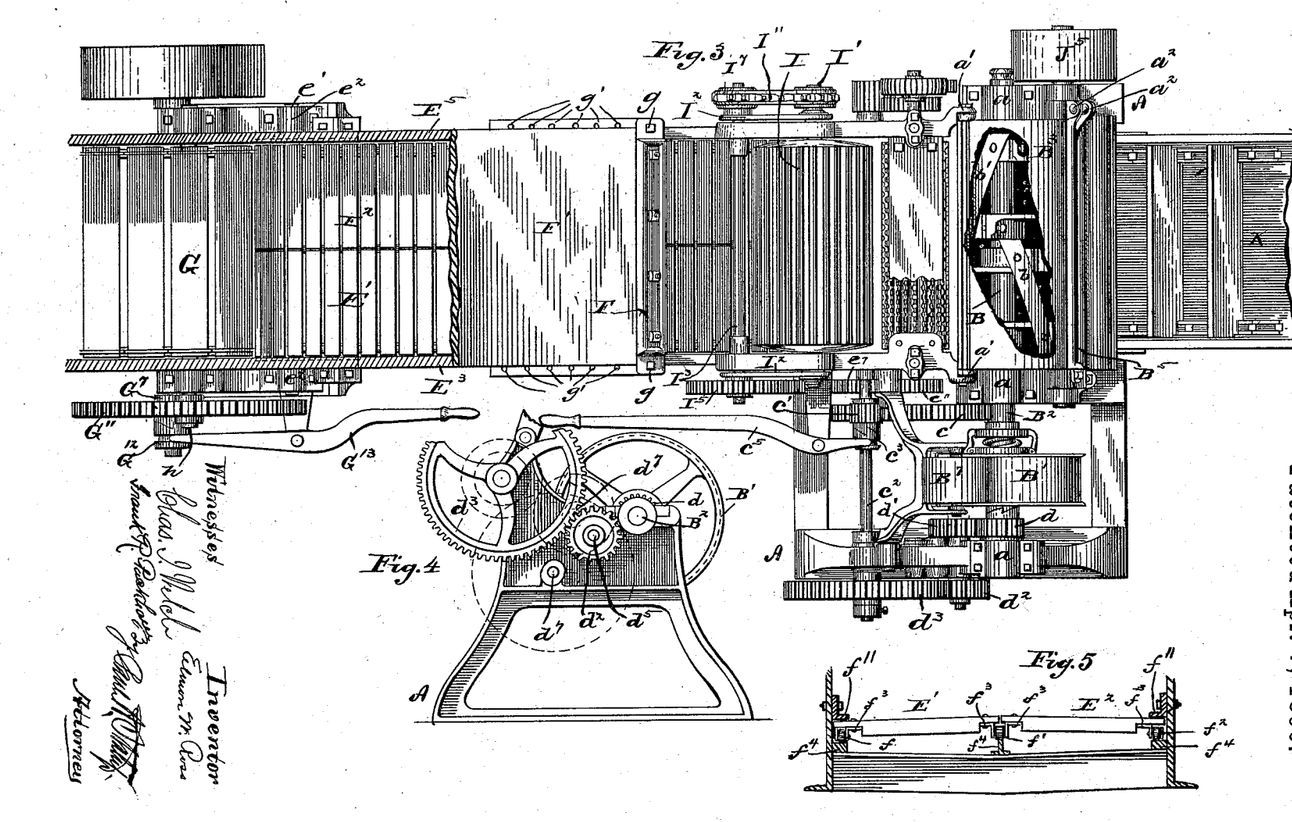
Fig. 3 is a plan view of the same.
Fig. 4 is an end elevation of the feed-driving gearing omitted in Fig. 1.
Fig. 5 is a partial sectional view of the feeding-carrier.

The cutting-cylinder B consists, essentially, of knife-heads $b$, having knives $b'$ secured thereon. These knives $b'$ are made in sections in the length of the cylinder and are placed spirally thereon, the pitch or shear of the knives being in opposite directions from the center of the cylinder and the knives in one section being arranged back of the knives in the other section. To produce the best results and to secure a continuous action of the knives and a uniform strain on the cylinder-shaft, I place the forward ends of the knives in one section or series opposite to the rear ends of the knives in the other section or series, as shown in Fig. 3. In this way it will be seen that the knives are placed so as to secure a shearing action and so arranged that as soon as one knife has completed its cut the other knife begins to cut, thus producing a continuous operation, while at the same time the end thrust of the cylinder which would result from the use of a single series of knives with a pitch or shear in one direction only is prevented.

By arranging the knives with their pitch or shear in opposite directions from the center there is a tendency to force the material cut thereby to the end of the cutting-cylinder, which will prevent the material from passing uncut between the knives of the respective sections, which is sometimes the case when the shear of the knives is arranged in opposite directions toward the center and the broken sections or series, as described, are employed.

As before stated, the power to drive the cutting mechanism is transmitted by a belt or other suitable means to the safety-pulley B'. In order to provide for readily removing the cutting-cylinder, its shaft, and the driving-pulley, when desired, I preferably make the pulley with small projecting side flanges and provide a tightener B⁷, supported in suitable bearings on the main frame and adapted to be moved to or from the driving-belt, so as to tighten the same on the safety-pulley B', or release the said belt to permit it to be readily removed from said driving-pulley and thus disengage it from the cutter-shaft.

It may be well to state here that cutters of the character herein described are designed to run almost continuously during the sugar season and are adapted to cut immense quantities of sugar-cane, some of them already in use having been run up to a capacity of twenty tons per hour. It is therefore necessary that two or more cutting-cylinders be employed and means provided for readily removing one and inserting another into the machine with as little delay as possible, so that the knives on one cylinder may be sharpened and reset while the other cylinder is in operation. It is also necessary that means be provided for uniformly feeding the canes to the machine in a rapid manner, the feeding device being adapted to take canes of various sizes or broken or crooked or in entangled masses and to feed them automatically into the cutting device without any checking or stoppage thereof and in such a manner that they will be operated upon by the cutting-cylinder to produce chips or pieces of a uniform length, cut as nearly as possible squarely across the canes, and thus at right angles to the cells which contain the juice.

Immediately in front of the cutting-cylinder are the feeding-rolls C and C', which are adapted to feed the canes over the ledger-bar D and in a position to be operated upon by the knives B of the cutting-cylinder, acting in connection with said bar. The lower feeding-roll is provided throughout its length with rows of teeth extending around its circumference, with circumferential grooves between the respective rows, which grooves extend below the bottom of the said teeth. The ledger-bar D is provided with a series of teeth on the front surface thereof, as shown at D', (see Fig. 15,) adapted to extend into the circumferential grooves above referred to and fit snugly therein, and thus dislodge any portions of cane which may become entangled therein, and, further, preventing any juice which may be extracted from the canes by said rolls from dropping underneath the said rolls. Immediately back of the series of teeth the ledger-bar is provided with a recess or depression, into which is fitted a steel plate D², which projects slightly beyond the rear side of the ledger-bar D, but fits snugly against a shoulder formed in the top of said bar and preferably flush with the tops of the teeth D'. This plate D² is formed on both edges alike and is held into position by suitable fastening-screws, which pass centrally through the same, so that said plates may be reversed on the ledger-bar D, and thus present a new surface to the cutting-cylinder should one become abraded or worn.

The front and rear sides of the ledger-bar D are preferably formed concave, as shown, to correspond to the curve of the lower feeding-roll and the cutting-cylinder plates on each side thereof and to secure greater strength for the bar. I further provide at the bottom of said bar a curved rib or extension D³, extending backwardly and downwardly from said bar, to further strengthen said bar and to deflect the pieces of cane as they pass from the cutting-cylinder, as hereinafter more fully described.

The lower feeding-roll C receives its motion through the medium of a gear $c$ and a pinion $c'$ from a counter-shaft $c^2$, which is driven directly from the cylinder-shaft B² through the medium of suitable gears $d$, $d'$, $d^2$, and $d^3$, in a manner hereinafter more fully described.

The pinion $c'$ is placed loosely on the shaft $c^2$, and is adapted to be connected thereto by means of a sliding clutch $c^3$, operated by a bifurcated lever $c^5$ in a well-known manner to connect and disconnect said pinion to and from said shaft, as desired.

Motion is transmitted to the upper roll $C'$ from the lower roll $C$ at its opposite end through suitable gearing $C^3$, arranged substantially as set forth in my Letters Patent No. 454,920, of June 30, 1891, so as to permit the said upper roll to rise and fall independently at each end to compensate for the varying quantities of material which pass between said rolls.

In order to secure a uniform and satisfactory feed with the best results, I provide the upper feeding-roll $C'$ with a series of radial ribs or flutes $c^7$, which, in connection with the circumferential rows of teeth in the lower roll, produce excellent results in uniform feeding. In order to further guard against any lateral movement of the canes as they are brought to the action of the cutting-knives by the shear of the knives before referred to, I provide each of the radial projections with a notched or serrated edge, the notches or grooves being preferably formed semicircular, as shown at $c^{11}$, and preferably formed with their radii slightly less than that of the cane, so that the cane will be engaged and held thereby without being forced into or entangled in the said notches.

Immediately in front of the feeding-rolls $C$ and $C'$ is an endless carrier $E$, which I term the "feeding-carrier" to distinguish it from the receiving-carrier, which will be hereinafter referred to. This endless carrier $E$ consists of a series of narrow slats secured on endless chains, which pass over suitable sprocket-wheels on the supporting-shafts $e$ and $e'$ at the opposite ends of said carrier. Three strands of chain $f$, $f'$, and $f^2$, passing over a similar number of sprocket-wheels at each end, are preferably used, the slats being secured to said chains by small laterally-projecting flanges $f^3$, and the said chains being preferably provided with supporting-ways $f^4$, so as to support the carrier rigidly throughout that portion thereof which travels toward the feeding-rolls. The chains which I preferably use are known as "roller-chains" and consist of suitable links $f^5$, connected together and embracing rollers $f^7$, which travel on the supporting-ways $f^4$, as shown in Fig. 5.

To guard against the raising of the carrier at the sides and to prevent, as far as possible, dirt or other substance from passing through the carrier to the supporting-ways $f^4$ at the sides thereof, I provide on each side of the carrier-frame an angle-piece $f^{11}$, secured to the side of the carrier-frame and projecting over the ends of the carrier-slats, as shown in Fig. 5.

To further guard against breakage of the carrier-slats and to secure as much flexibility as possible in the carrier, which shall at the same time form a solid bed for the canes fed thereby, I make the feeding-carrier in two sections $E'$ and $E^2$, the inner ends of the slats of each section being joined to the central endless chain on each side thereof by angle-plates $f^3$. By this construction a solid bed is secured for the cane as it is received on this carrier and carried thereby to the feeding-rolls, while at the same time a certain amount of flexibility is secured for said carrier, which will permit it to pass over any obstructions in the way of dirt or other foreign substances which may fall onto or accumulate on the supporting-ways $f^4$.

Extending transversely across the feeding-carrier $E$ and adapted to be secured at each end to the respective sides $E^3$ and $E^5$ of said carrier is a tie beam or bar $F$, adapted to be secured in different positions of adjustment along the carrier-frame by means of fastening-bolts $g$ and a series of openings $g'$, provided in the top flange of the respective carrier sides $E^3$ and $E^5$. Secured to the said tie-bar $F$ and extending forwardly and upwardly therefrom is a deflecting-board $F'$, adapted to deflect the canes as they are presented to the feeding-carrier, in a manner hereinafter more fully described.

Figure 1:
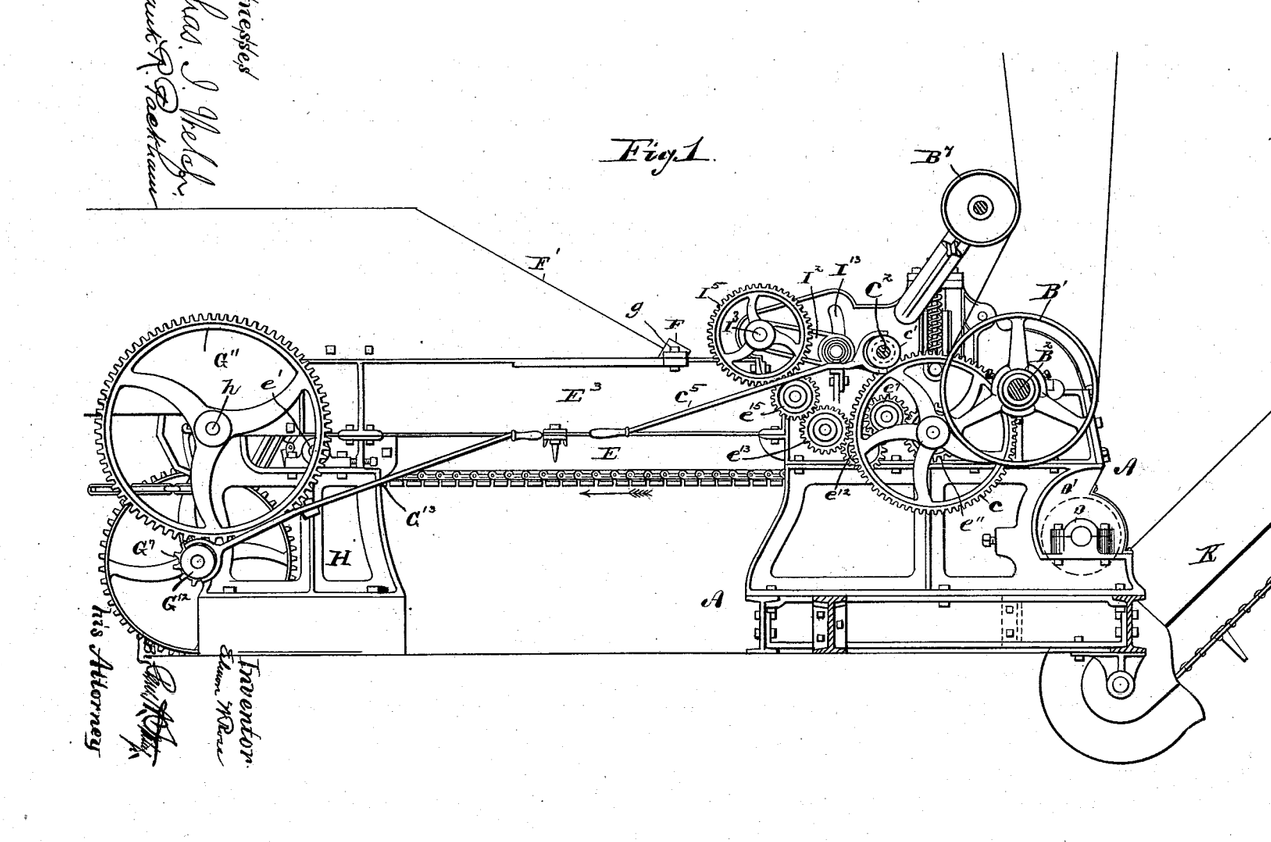
Figure 1 is a side elevation of a machine embodying my invention, some of the parts being shown partly in section, this view representing the right-hand side of the machine.
Figures 2, 14, 15:
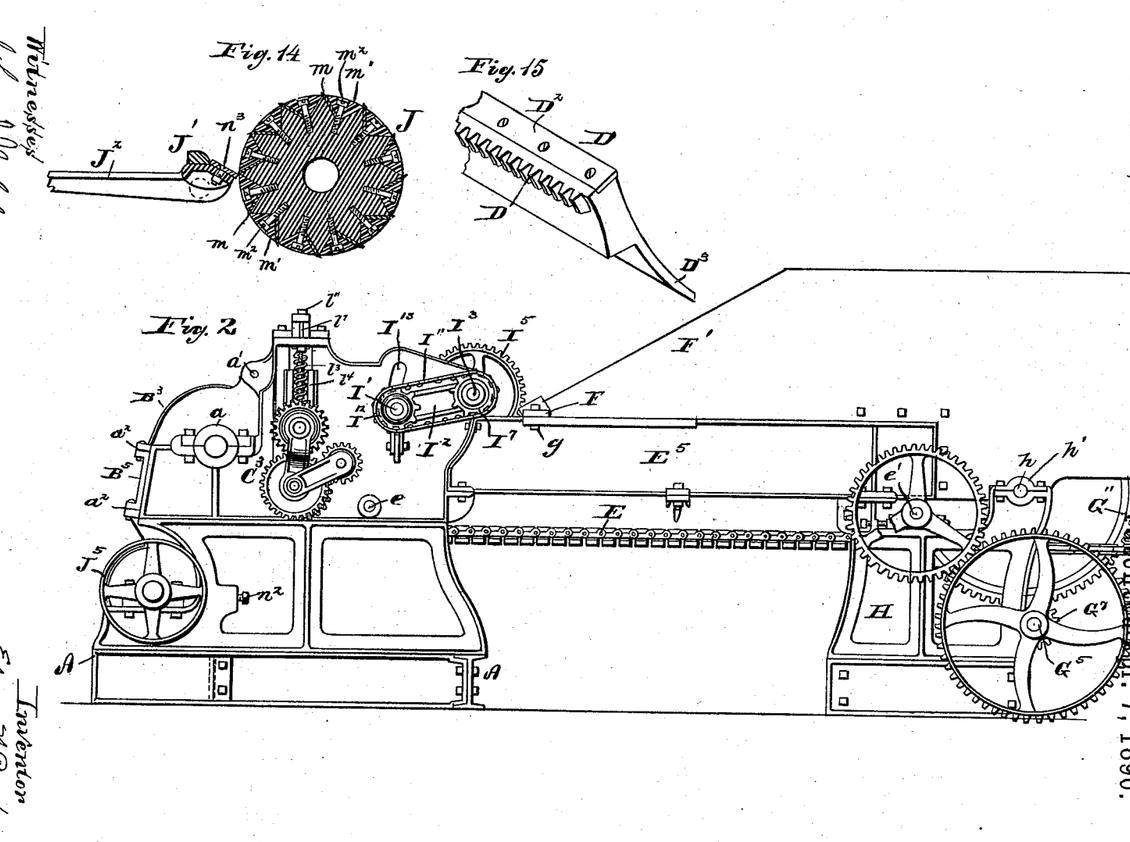
Fig. 2 is a similar elevation of the left-hand side of the machine.
Figs. 12, 13, and 14 are detailed views of the comminuting mechanism and means for supporting the same.
Fig. 15 is a detailed view in perspective of a portion of the main ledger-bar, which acts in conjunction with the cutting-cylinder.
Figures 16, 17, 18, 19:
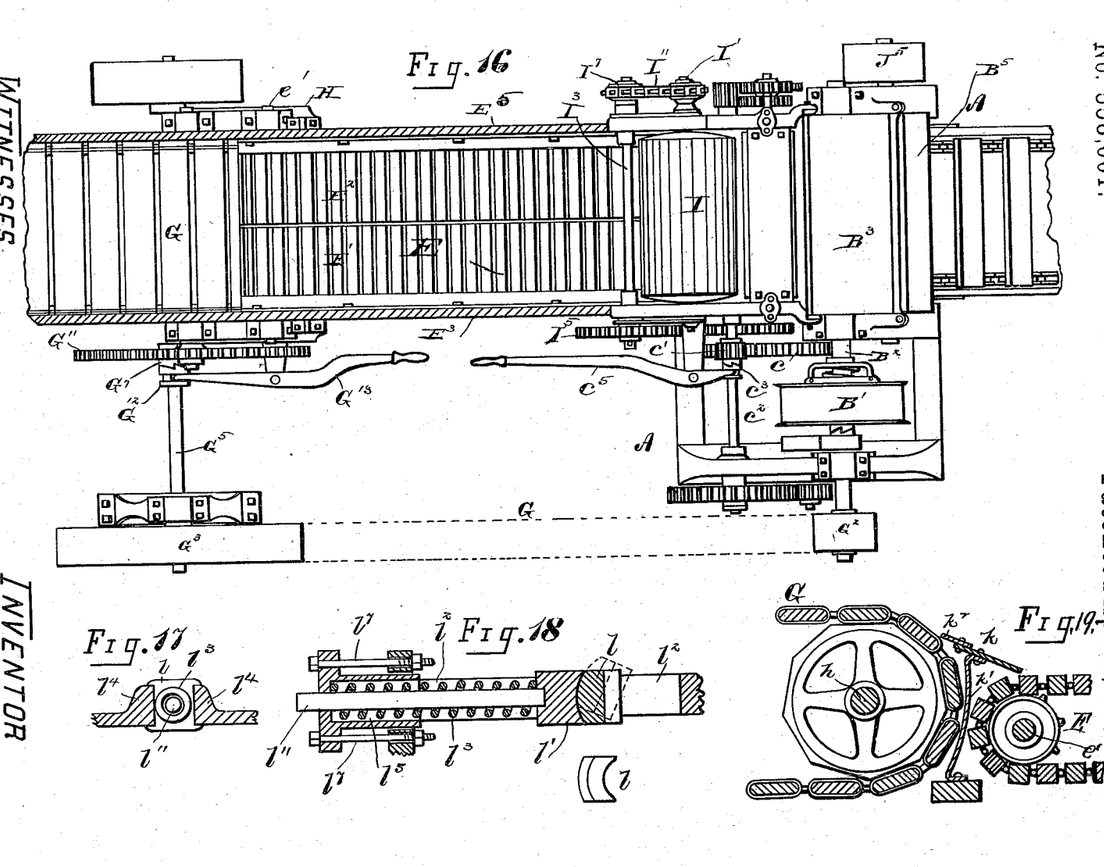
Fig. 16 is a plan showing method of driving cutter.
Figs. 17 to 19 are details.

Immediately in front of the feeding-carrier, forming practically a continuation thereof, is the receiving-carrier $G$, which may be made of any desired length and extend several hundred feet from the machine to receive the canes to be operated upon. This receiving-carrier $G$ consists of a series of slats attached to endless chains running over suitable supporting-wheels and runs at a uniform speed with or at a lower speed than the feeding-carrier $E$. The receiving-carrier may, if desired, be driven, as shown in Figs. 1, 2, and 3, directly from the feeding-carrier, suitable gearing being provided in this case to reduce the speed of the receiving-carrier from that of the feeding-carrier, as shown. I preferably, however, drive the receiving-carrier directly from the main shaft, as shown in Fig. 16, by means of a belt $G'$, extending over suitable pulleys $G^2$ and $G^3$ on the main shaft and on a counter-shaft $G^5$, respectively, a pinion $G^7$ being provided on the counter-shaft adapted to engage with a gear $G^{11}$ on the driving-shaft of the receiving-carrier, a clutch $G^{12}$, operated by a suitable shifting-lever $G^{13}$, being provided, by means of which the pinion $G^7$ may be connected and disconnected to and from the counter-shaft $G^5$, as desired. The sliding clutch $G^{12}$, on which is the shifting-lever $G^{13}$, is similar to those $c^3$ and $c^5$ before described in the feed-gearing. These same constructions are employed when the receiving-carrier is driven from the feeding-carrier, as shown in Figs. 1, 2, and 3. When constructed as above, the lowest speed of the feeding-carrier is uniform with the constant speed of the receiving-carrier.

The rear end of the receiving-carrier $G$ and the front end of the feeding-carrier $E$ are supported on a stand H, which also supports the front ends of the carrier sides $E^3 E^5$. The supporting-shaft $e'$ of the feeding-carrier runs in sliding bearings $e^2$, which rest at $e^3$ in the top of said stand, the driving-shaft $h$ of the receiving-carrier being journaled in a stationary bearing $h'$ in said stand, as shown more clearly in Fig. 10. Adjusting-screws $e^5$ are provided, whereby the bearings $e^2$ may be adjusted as desired, and thus adjust the endless chains of the feeding-carrier. Similar means are also provided for tightening the chains of the receiving-carrier.

The feeding-carrier receives its motion directly from the lower or main feeding-roll through the medium of an intermediate gear $e^7$, engaging with a gear $e^{11}$ on the lower feeding-roll and a similar gear $e^{12}$ on the supporting-shaft $e$ of the feeding-carrier E.

Figure 6:
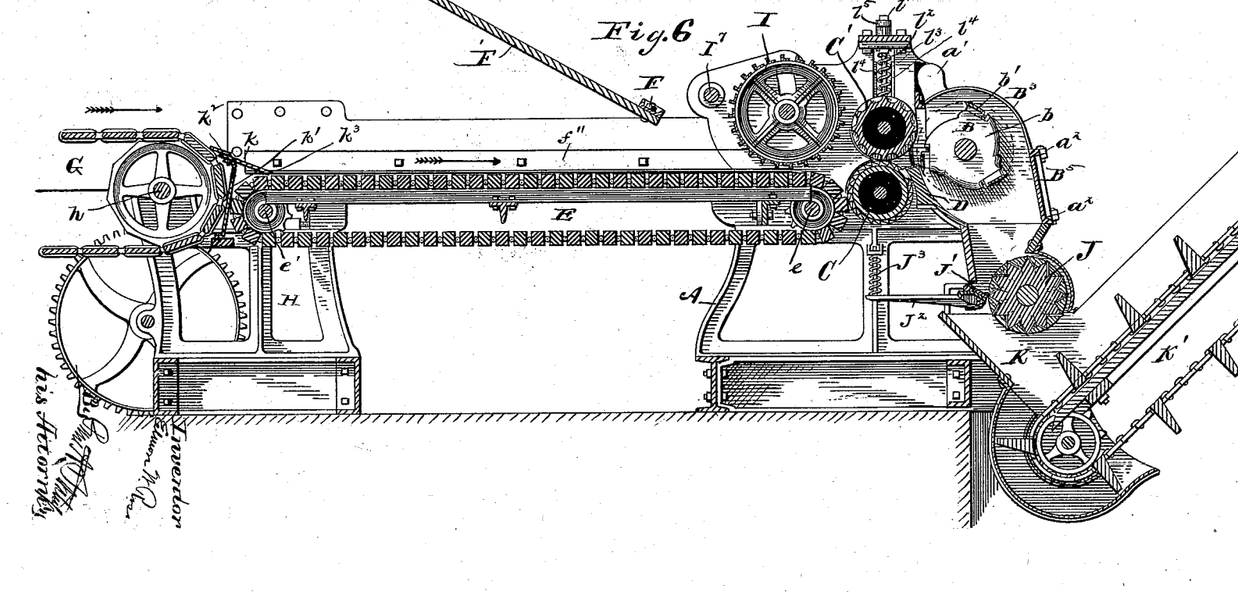
Fig. 6 is a longitudinal sectional view taken at or near the center of the machine.
Figures 7, 8, 9, 10, 11:
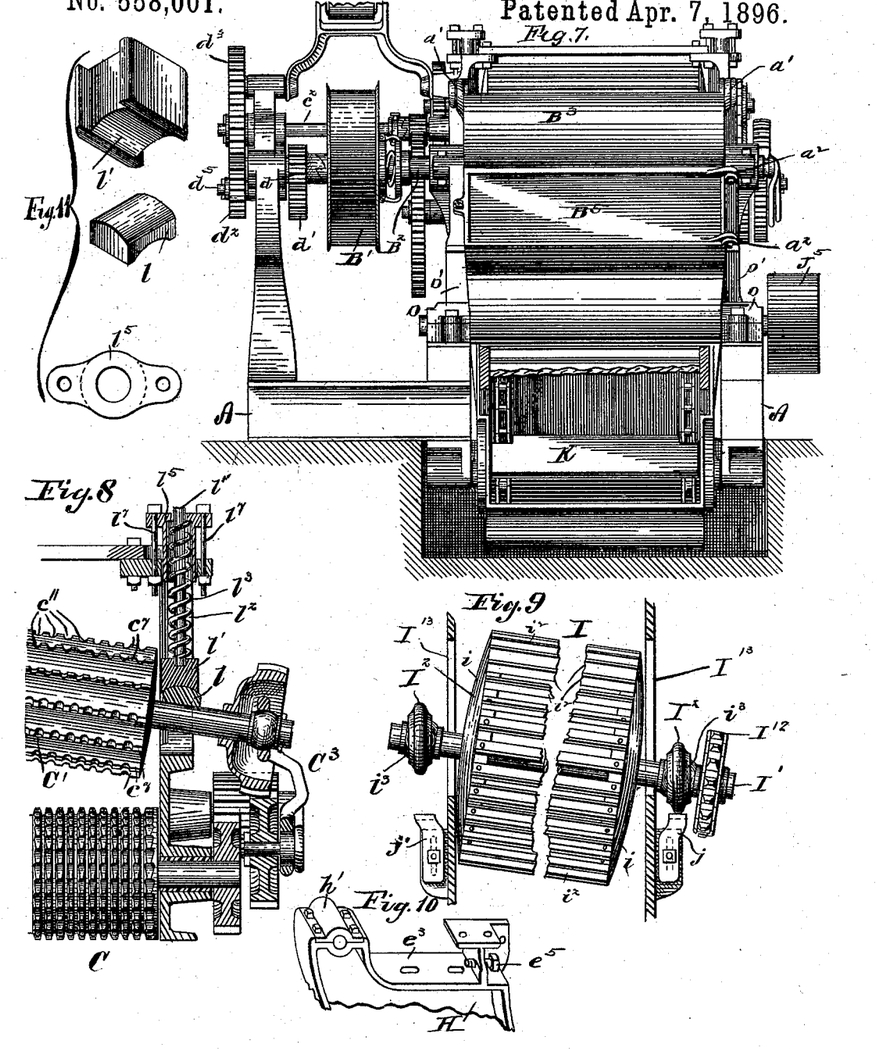
Figure 12:
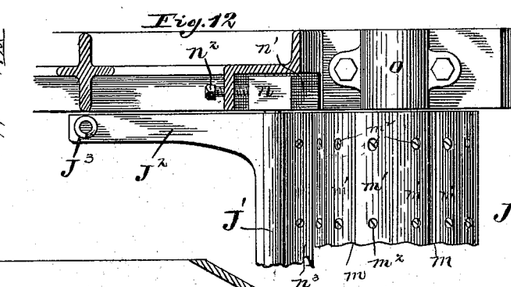
Figure 13:
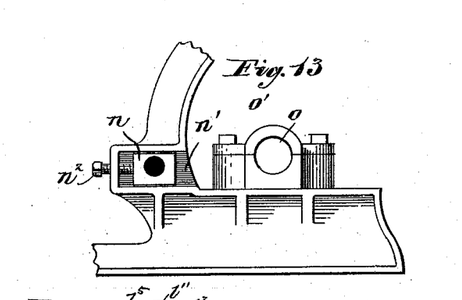

In front of the feeding-rolls and immediately above and over the rear end of the feeding-carrier I provide a large roller I, which I term the "compression-roller." This roller preferably consists of suitable heads $i$, supported on a shaft $I'$ and connected together at their peripheries by longitudinal slats $i^2$, preferably made of angle-iron, so as to form a series of ribs, as shown in Figs. 6 and 9. This roller I is journaled at each end in ball-and-socket bearings $i^3$ in pivoted arms $I^2$. The arms $I^2$ are pivoted on a transverse shaft $I^3$, which extends across the machine and is provided at one end with a gear $I^5$ and at the other with a sprocket-wheel $I^7$. The gear $I^5$ receives its motion directly from the feeding-carrier gear $e^{12}$ through the medium of intermediate gears $e^{13} e^{15}$, and motion is transmitted from the sprocket-wheel $I^7$ to the shaft $I'$ by a chain $I^{11}$, operating on a sprocket-wheel $I^{12}$ on said shaft $I'$. The arms $I^2$ are adapted to vibrate on the shaft $I^3$ to permit the roller I to rise and fall over the carrier I. For this purpose the shaft $I'$ extends through slotted openings $I^{13}$ in either side of the main frame A. The bearings $i^3$, in which the shaft $I'$ turns, are ball-bearings, each cast within a socket in one of the arms $I^2$, so as to turn freely in any direction therein. By this construction the roller I is permitted to rise and fall independently at either end, as desired, the chain which drives the same being sufficiently loose to permit any desired vibration of the said roll.

The compression-roller I, as before stated, is supported above the rear end of the feeding-carrier. The object of this roller is to compress the canes which are brought forward on the feeding-carrier and hold the same in position thereon and force them into the feeding-rolls. To prevent the roller from coming in contact with the carrier and to furnish means for adjusting the height at which the said roller stands above the carrier, adjustable stops $j$ are provided, against which the arms $I^2$ rest when the roller is in its lowest position.

The deflecting-board F' before referred to is placed a short distance in front of the compression-roller I and preferably extends down to a point opposite to or slightly below the center of the compression-roller. The canes carried by the receiving-carrier are deposited onto the feeding-carrier in loose and irregular masses, by which they are taken under the deflecting-board F' to the compression-roller I, by which they are engaged, compressed, and directed to the feeding-rolls, and thence to the cutting mechanism.

The feeding-carrier is made of a length slightly less than the average length of the canes. As before stated, the feeding-carrier generally runs faster than the receiving-carrier. As soon, therefore, as the forward ends of the canes are discharged to the feeding-carrier the said canes are accelerated in speed and moved more rapidly by the feeding mechanism to the cutters, thus preventing any accumulation of material and preventing clogging in the feeding mechanism.

The canes are fed to the carrier in large masses. More or less dirt and trash is collected therewith and falls on the receiving-carrier G. To prevent the dirt and trash, as well as crooked and small canes, from passing downwardly between the carriers at the stand H, the upper traveling surface of the receiving-carrier is preferably placed slightly above that of the feeding-carrier and a bridge $k$ provided, of flexible material or provided with flexible ends adapted to press against the traveling surfaces of the respective carriers. This bridge $k$ bears at each end against the traveling surfaces of the moving carriers, and thus assists in transferring short stalks and other material from one carrier to the other, and at the same time prevents any of the material from passing between the carriers. A certain amount of the small foreign substances brought in by the receiving-carrier will, however, pass under the edge of the bridge which bears against said receiving-carrier and be carried downwardly by said carrier. Owing to the position of the respective carriers there is a tendency to discharge this dirt or foreign substance onto the upcoming portion of the feeding-carrier E. At this point, the feeding-carrier being in the act of passing around the supporting-wheels, the slats forming the bed or surface thereof are open considerably at their outer edges. Should dirt or foreign matter fall on the carrier at this point, it becomes wedged between the slats, and when they assume their normal position on the supporting-ways, the slats being closed together, this material is wedged tightly between the slats, and if a rigid substance has been lodged thereon a breakage of the carrier results. It is essential that every possible precaution should be taken that no such breakage of the feeding-carrier can occur, because in such an event the loose portion or end of the carrier will be caught by the feeding-rolls and drawn into the knife-cylinder, which would result most disastrously to the machine. To provide against foreign substances being thrown into the feeding-carrier slats from the receiving-carrier, I preferably support the bridge on a deflecting-strip $k'$, which may be formed of wood or sheet-iron or other suitable material (see Fig. 6) and extends entirely across the machine between the ends of the respective carriers. The bridge $k$ may also be made of the same material, with rubber or other flexible strips $k^2$ $k^3$ at each end to bear against the respective carriers. By this means any dirt or other foreign substances carried under the bridge $k$ at the rear end of the receiving-carrier is deflected by the deflecting-strip $k'$ and passes under the machine, from whence it may be easily removed.

The general operation of the machine, it is thought, will be understood from the above description. The receiving-carrier G extends along a railroad-track or wagon-road, and the canes are pushed from the cars or wagons in large quantities onto said receiving-carrier. It is moved forward on said carrier and discharged to the feeding-carrier, where the speed is accelerated and the canes slightly compressed by the deflecting-board F', which may be adjusted forward or back to accomplish the best results. In this condition it passes to the compression-roller I, which, being supported in universal bearings in pivoted arms, is adapted to rise and fall in any position to accommodate itself to the varying masses of cane which are brought thereto. By the action of the compression-roller the cane is further compressed and brought to a more uniform condition for the feeding-rolls, and, acting in connection with the feeding-carrier, forces the said canes into the feeding-roll, from whence they are delivered to the cutting-cylinder. The rapid-revolving cylinder cuts the canes into suitable lengths and discharges the same to the shredder or comminuting-cylinder, where it is comminuted or shredded and discharged from the machine in a manner hereinafter more fully described.

In order that the machine may successfully prepare all kinds of cane for the different processes of making sugar—that is, by the roller-mill and by the diffusion process—it is desirable that means be provided for varying the length of the pieces into which the cane is cut. To accomplish this, I provide means for varying the speed of the feeding mechanism with reference to the cutting mechanism. This I preferably accomplish in the manner shown in Figs. 3 and 4. As before stated, motion is imparted to the feeding mechanism from the cylinder-shaft through the medium of gears $d$, $d'$, $d^2$, and $d^3$, the counter-shaft $c^2$, and its connections. The gears $d'$ and $d^2$ are placed on the opposite ends of a short stud or shaft $d^5$, which is journaled in a suitable bearing $d^7$ in the outer portion of the main frame A. A series of bearings $d^7$ are provided, in either of which the stud $d^5$ may operate. By changing the stud $d^5$ into the respective bearings $d^7$ and providing a suitable change of gear, as indicated in dotted lines in Fig. 4, the speed of the counter-shaft $c^2$, and thus the speed of the feeding mechanism, may be varied as desired.

The peripheral speed of the feeding-carrier is the same as that of the compression-roller, which is also the same as the peripheral speed of the feeding-rolls. The peripheral speed of the receiving-carrier is less than the peripheral speed of the feeding mechanism, except on the shortest cut. The peripheral speed of the feeding-carrier is preferably uniform with the peripheral speed of the receiving-carrier when the machine is adjusted for short cuts, which of course is the slowest speed of the feeding mechanism. When arranged as shown in Fig. 16, the speed of the receiving-carrier remains unchanged, the speed of the feeding-carrier and other feeding mechanism being accelerated to produce a longer cut. This is the preferable method of driving the respective parts. If the receiving-carrier is driven from the feeding mechanism, as shown in Fig. 3, then the difference in speed between the feeding-carrier and the receiving-carrier is maintained, and at all times the peripheral speed of the feeding-carrier and other feeding mechanism is greater than that of the receiving-carrier.

In order to provide for a free adjustment of the upper feeding-roll C' which will permit said roll to rise and fall at either end independently, and at the same time to secure a proper bearing for the same, I provide at each end of the said roll a bearing-box $l$, adapted to fit the trunnions or supporting-shaft of the said feeding-roll. This bearing-box is preferably made of brass, is formed convex on its outer surface, and is adapted to fit into a concave bearing in a reciprocating block $l'$, adapted to rise or fall vertically on ways $l^4$ in a slotted opening $l^2$ in the main frame. A spring $l^3$ rests at one end on the block $l'$ and at the other within an adjustable tube or sleeve $l^5$, having side flanges therein through which pass adjusting-bolts $l^7$, by means of which said tube or sleeve may be adjusted with reference to the main frame A. Extending upwardly from the block $l'$, within the tube or sleeve $l^5$, is a supporting-rod $l^{11}$, which is preferably secured at one end on the block $l'$ and passes through the spring $l^3$ to hold the same against any lateral movement. (See Figs. 8, 11, 17, and 18.) It will be seen that by this construction the upper feeding-roll is provided with a perfect bearing, which will permit the said roll to adjust itself to any desired position. Means are also provided by which the pressure of the feeding-roll upon the cane passing under the same may be regulated as desired by increasing the tension of the spring by an adjustment of the spring-holding tube, as described.

J is the comminuting-cylinder, which is journaled in suitable bearings secured to the main frame and is located below the cutting-cylinder B. This comminuting-cylinder is provided with a series of longitudinal knives $m$, which act, in connection with a cutter-bar J', to reduce the pieces of cane discharged from the cutting-cylinder to a comminuted or shredded condition. To accomplish this, the cylinder J is formed with a series of faces at an angle to the radius thereof, and on these the knives are secured. These faces are preferably formed by planing out a series of V-shaped grooves on the periphery of the cylinder, the knives being placed on one side of each of said grooves and V-shaped fastening-strips $m'$ being placed in said grooves, over the knives, to hold said knives in position and to fill out the periphery of the cylinder. By this construction the knives are allowed to project slightly beyond the periphery of the cylinder, which is otherwise practically solid, the knives being arranged at an angle to the radius of the said cylinder. The cutter-bar J' is pivoted in bearings at each end on the main frame and provided at each side with extending arms $J^2$, which rest in contact with springs $J^3$. The bearings $n$, which support the journals on which the cutter-bar J' is pivoted, are each located in a recess $n'$ in the main frame and adapted to be adjusted therein by a set-screw $n^2$ to adjust the cutter-bar to the proper position with reference to the knives $m$. The comminuting-cylinder J is supported in bearings $o$ on the main frame, which at this point is provided at each side with a recessed opening $o'$ to permit the comminuting-cylinder to be removed therefrom as desired.

The cutter-bar J' is provided at its upper edge with a plate $n^3$, which stands at an angle to the radii of the comminuting-cylinder J. A pocket or depression is thus formed over the cutter-bar and between the same and the comminuting-cylinder. Into this pocket or depression the pieces of cane are received from the cutting-cylinder, and from their peculiar shape and the construction shown lie longitudinally along the cutter-bar and are cut longitudinally or shredded by the comminuting-cylinder. By the construction of the cutter-bar, as described, with the springs $J^3$ the cutter-bar is permitted to yield with reference to the comminuting-cylinder by turning on its pivotal center in case any foreign substance passes between the said cylinder and bar, the springs being of a sufficient tension to retain the bar in position against the ordinary pressure thereon in shredding or comminuting the canes. Immediately below the comminuting-cylinder I provide a hopper K, in which the shredded cane falls and from which it is conveyed by an elevator or carrier K'. This elevator or carrier may be of sufficient length to carry the shredded canes directly to the roller-mills or to the diffusion-batteries, as the case may be.

By the construction of the comminuting-cylinder above described the knives $m$ may be removed by loosening the retaining or fastening strips $m'$, which may be held by the fastening-screws $m^2$ or in any other suitable manner. The knives being straight and arranged longitudinally on the periphery of the cylinder may be easily sharpened and replaced. The comminuting-cylinder receives its motion by a belt through the medium of a pulley $J^5$, arranged on the end of its shaft. The plate $n^3$ is made reversible on the cutter-bar J', so that should it become worn it may be reversed and new surfaces brought into action. The power to drive the comminuting-cylinder may be transmitted directly to said cylinder through the medium of a suitable belt from a counter-shaft or other suitable source of supply independent of the cane-cutter; or, if desired, it may be driven directly from the driving mechanism which drives the main cutter.

By the mechanism above described I produce a cutter adapted to handle the cane in large and uneven masses, reduce the same to any desired length suitable for the processes to which it is afterward to be subjected, comminute or shred it, and discharge it to the roller-mill or diffusion-battery so that the juice therefrom may be extracted to the best possible advantage.

The parts are all arranged so as to be easily accessible and to provide against accident, which would necessitate stopping the machine for repairs or adjustments. The gear in the feeding mechanism is so arranged that all the parts move at the same peripheral speed and are adapted to handle the cane in an automatic, uniform, and perfect manner. The clutch-levers $c$ and $G^{13}$, which control the feeding mechanism and the receiving-carrier, respectively, are projected inwardly to near a common point at which the operator stands. Perfect control of the machine is thus secured.

It is evident that a machine of this character admits of various modifications in its construction. I have not attempted to go into these at length, but have described and set forth those constructions which I have found in practice to be preferable, it being understood, however, that my invention is not limited to such specific constructions.

Having thus described my invention, I claim—

1. The combination with a feeding-carrier and the carrier sides, of a tie-bar connecting said sides, and a deflecting-board arranged at an angle to the carrier and supported on said tie-bar, said tie-bar being adjustable along said carrier sides, and means for holding it in different positions of adjustment, substantially as specified.

2. The combination with a cutting-cylinder, of a feeding-carrier and a receiving-carrier, said receiving-carrier being adapted to discharge on said feeding-carrier, independent driving mechanism for the respective carriers, detachable clutches forming a portion of each of said driving mechanisms, and a clutch-lever extending in opposite directions toward a common point for detaching either or both of said driving mechanisms, substantially as specified.

3. The combination with the receiving and feeding carriers, of a deflecting-strip between said carriers, and a bridge supported on said deflecting-strip and provided with yielding ends to bear against said carriers, substantially as specified.

4. The combination with a cutting-cylinder and a feeding mechanism, of a feeding-carrier formed of transverse slats in two sections, substantially as specified.

5. In a cutter, a feeding-carrier formed of transverse slats and endless chains, as described, said slats being formed in two sections connected yieldingly together, substantially as specified.

6. The combination with a feeding mechanism, of an endless feeding-carrier composed of transverse slats and longitudinal supporting-ways, said transverse slats being made in two sections and connected yieldingly together, substantially as specified.

7. The combination in a feeding-carrier, of endless chains, and transverse slats made in two sections connected yieldingly together, as described, of longitudinal ways under said slats, and projecting flanges at the sides of said carrier above said slats, substantially as specified.

8. The combination with a cutting-cylinder, feeding-rolls, and a feeding-carrier in front of said cylinder, the lower feeding-roll being journaled in fixed bearings and the upper feeding-roll being adapted to yield as described, a transverse shaft above said feeding-carrier and geared thereto, a pivoted vibrating compression-roller arranged above said feeding-carrier and pivotally journaled in arms which are hinged to said shaft, a driving connection from said transverse shaft to said compression-roller, and a geared connection between said feeding-rolls and carrier whereby said carrier, feeding-rolls and compression-roller are adapted to operate at a positive uniform speed, substantially as specified.

9. The combination with a cutting-cylinder, of two carriers, a receiving-carrier and a feeding-carrier, said receiving-carrier being driven directly from the main driving-shaft, and means for varying the speed of said feeding-carrier to produce a longer or shorter cut at the cutting-cylinder without changing the speed of the receiving-carrier, substantially as specified.

10. The combination with a cutting-cylinder, of two carriers, a receiving-carrier and a feeding-carrier, the feeding-carrier being adapted to travel at a greater peripheral speed than the receiving-carrier, said feeding-carrier being formed in sections yieldingly connected together, and supported on rigid supporting-ways, substantially as specified.

11. The combination with a cutting-cylinder, of a receiving-carrier and a feeding-carrier, a deflecting-board adjustably secured above said feeding-carrier, a pivoted, vibrating compression-roller above said feeding-carrier and behind said deflecting-board, said compression-roller being journaled in universal bearings in pivoted rocking arms, and means for driving said roller at the same peripheral speed with said feeding-carrier, substantially as specified.

12. The combination with a cutting-cylinder, of feeding-rolls arranged in front of said cylinder, one of said feeding-rolls being journaled in fixed bearings and the other being adapted to yield independently at each end to compensate for varying material fed thereby, a feeding-carrier traveling on fixed longitudinal ways slightly below the unyielding feeding-roll, and a compression-roller journaled at each end in pivoted bearings in rocking arms, said compression-roller being arranged in front of said feed-rolls and above said feeding-carrier, substantially as specified.

13. The combination with a lower feeding-roll journaled in unyielding bearings, of an upper yielding roll provided with independent oscillating bearing-plates journaled in concave bearing-blocks, a spring over each of said bearing-blocks, and means for adjusting the tension of said springs, substantially as specified.

14. The combination with a lower feeding-roll journaled in unyielding bearings, and an upper yielding roll provided with independent oscillating bearing-plates journaled in concave bearing-blocks, a spring over each of said bearing-blocks, a spring-holding tube supporting one end of said spring, and means, as specified, for adjusting said tube to vary the tension of said spring, substantially as specified.

15. The combination with a lower feeding-roll journaled in fixed or unyielding bearings, and an upper yielding roll provided at each end with a fixed bearing-plate adapted to engage in a concave surface in a bearing-block, a guide-rod on said bearing-block, a spring around said guide-rod, a spring-holding tube about said spring, and means, as described, for adjusting said tube to vary the tension of said spring, substantially as specified.

16. The combination with a feeding-carrier, and a compression-roller journaled above said carrier, pivoted rocking arms having universal bearings to support said roller, and independent adjustable stops adapted to contact with said arms and limit the movement of said roller toward said feeding-carrier, substantially as specified.

17. The combination with a feeding-carrier formed in two sections connected yieldingly together, of a vibrating rocking roller journaled in universal bearings above said feeding-carrier, pivoted arms supporting said universal bearings, and adjustable stops to limit the movement of said pivoted arms, substantially as specified.

18. The combination with a cutting-cylinder and feeding-rolls arranged in front of said cylinder, a feeding-carrier in front of said feeding-rolls, a compression-roller journaled in pivoted arms above said carrier and in front of said feeding-rolls, a deflecting-board in front of said compression-roller, a transverse shaft constituting the pivotal center of said rocking arms, said shaft being geared to said feeding-carrier, and a driving-chain connecting said transverse shaft to said roller, substantially as specified.

In testimony whereof I have hereunto set my hand this 25th day of January, A. D. 1890.

ELMORE W. ROSS.

Witnesses:
    JOSHUA SCOTT,
    CHAS. I. WELCH.